United States Patent [19]

Raverdy et al.

[11] Patent Number: 5,146,076
[45] Date of Patent: Sep. 8, 1992

[54] INPUT SCREEN FOR RADIOLOGICAL IMAGE INTENSIFIER TUBE UTILIZING AN ANTI-REFLECTING LAYER

[75] Inventors: Yvan Raverdy, Bas Bernin; Francois Chareyre, St. Egreve; Paul De Grott, St. Ismier, all of France

[73] Assignee: Thomson Tubes Electroniques, Boulogne Billancourt, France

[21] Appl. No.: 640,386

[22] PCT Filed: May 15, 1990

[86] PCT No.: PCT/FR90/00340

§ 371 Date: Jan. 23, 1991

§ 102(e) Date: Jan. 23, 1991

[87] PCT Pub. No.: WO90/15432

PCT Pub. Date: Dec. 13, 1990

[30] Foreign Application Priority Data

May 30, 1989 [FR] France .................. 89 07086

[51] Int. Cl.$^5$ ............................ H01J 31/50
[52] U.S. Cl. .................. 250/213 VT; 313/103 CM
[58] Field of Search ......... 250/213 VT; 313/103 CM; 378/19

[56] References Cited

U.S. PATENT DOCUMENTS 4,855,589 8/1989 Enck et al. .................. 250/213 VT

*Primary Examiner*—David C. Nelms
*Assistant Examiner*—T. Davenport
*Attorney, Agent, or Firm*—Roland Plottel

[57] ABSTRACT

An input screen for radiological image intensifier tube that includes a scintillator (12), deposited on an aluminum substrate (10), which converts incident X-photons into visible photons which then go on to excite a photocathode (16). Previously, the luminous photons produced by the scintillator were emitted towards and were reflected by the aluminum layer; but this reflection reduces the resolution. According to the invention, in order to suppress this reflection, an input screen—in which a thin layer (20), transparent or slightly absorbent to the wavelengths emitted by the scintillator and or size to cause an anti-reflecting effect—is interposed between the aluminum substrate and the scintillator. Choices of anti-reflecting slightly absorbent layer include indium oxide, or alternatively antimony, tin or bismuth oxide, or a combination of these oxides, such as indium-tin oxide. The thickness is from a few hundred to a few thousand angstroms.

9 Claims, 1 Drawing Sheet

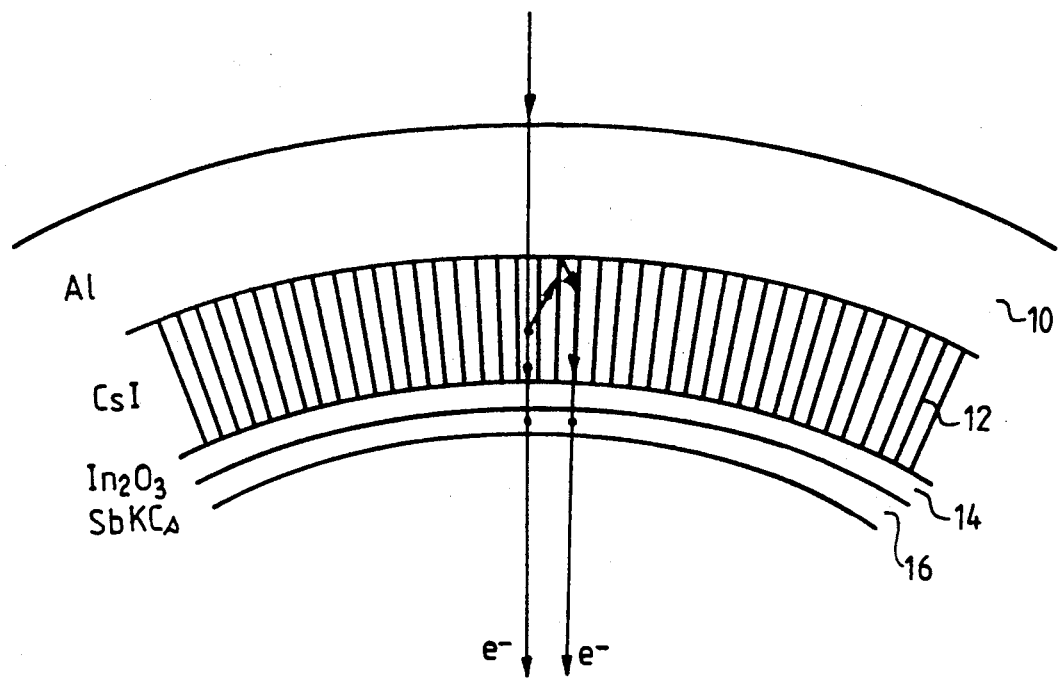
FIG_1
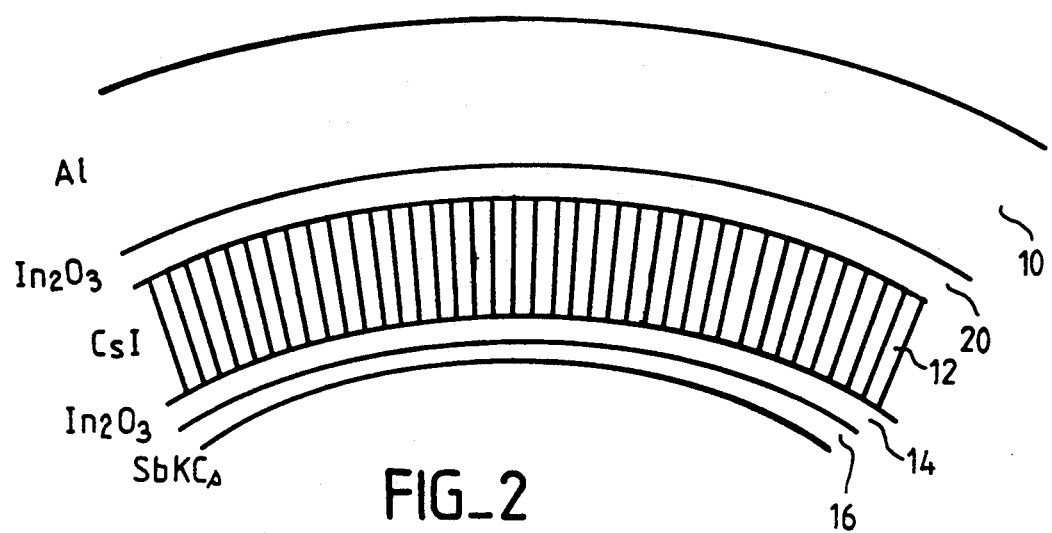
FIG_2

INPUT SCREEN FOR RADIOLOGICAL IMAGE INTENSIFIER TUBE UTILIZING AN ANTI-REFLECTING LAYER

The present invention relates to an input screen for a radiological image intensifier tube.

Radiological image intensifier tubes allow a radiological image to be transformed into a visible image, generally to afford medical observation.

These tubes include an input screen, an electron optics system, and a screen for observing the visible image.

The input screen comprises a scintillator which converts incident X-photons into visible photons which then go on to excite a photocathode, generally constituted by an alkali antimonide, for example potassium antimonide doped with caesium. The photocathode thus excited generates an electron flux.

The electron flux issued by the photocathode is then transmitted by the electron optics system which focuses the electrons and directs them onto an observation screen consisting of a luminophore which then emits visible light. This light can then be processed, for example, by a television, cinema or photographic system.

In the most recent constructions the input screen comprises an aluminium substrate covered by the scintillator, itself covered by an electrically conductive and transparent layer, for example made from indium oxide. The photocathode is deposited onto this transparent layer.

The X-rays strike the input screen on the aluminium substrate side, and pass through this substrate so as to then reach the material constituting the scintillator.

The luminous photons produced by the scintillator are emitted somewhat in all directions. However, in order to increase the resolution of the tube, a substance such as caesium iodide, which has the property of growing in the form of crystals perpendicular to the surface on which they are deposited, is generally chosen as the scintillation material. The needle-shaped crystals thus deposited tend to guide the light perpendicularly to the surface, this being favourable to a good image resolution.

However, luminous photons are also emitted towards the rear, that is to say they spread towards the X-ray arrival side. These photons go on to strike the aluminium substrate, with an incidence which is random. They are reflected by the aluminium substrate towards the front, hence towards the photocathode, but the path of these photons is such that a loss of resolution results: a same X-photon incidence can result in the creation of electrons in the photocathode at different points.

FIG. 1 illustrates this loss of resolution by showing side by side the different paths followed by two luminous photons coming from the impact of a X-photon on the scintillator, resulting in the formation of electrons at different points of the photocathode. In FIG. 1 are recognised, the aluminium substrate 10, in general cambered, constituting the input face by which the X-rays arrive, the scintillator 12 made from caesium iodide, the crystals of which perpendicular to the surface tend to channel the luminous photons, the transparent conductive sub-layer 14 and the photocathode 16.

There could be envisaged the interposing, between the aluminium substrate 10 and the scintillation layer 12, a black, light-absorbing layer, so that there are no reflections on the aluminium surface and hence no creation of electrons in the photocathode from luminous photons coming from such a reflection.

However, this is difficult since it is not known how to adequately position such layers: if this absorbent layer is a metal layer, its absorption is difficult to control; depending on the conditions of deposition, the metal layer is either absorbent or reflective. If the absorbent layer is a black glass (glass loaded with metal particles) it is difficult to deposit; the fact that the screen is cambered does not make matters easier. If finally the absorbent layer is a layer constructed from organic matter, it will not be very compatible with the vacuum conditions which prevail inside the tube.

According to the invention, it is proposed to construct an input screen in which a thin anti-reflecting layer, transparent or slightly absorbent (at the wavelengths emitted by the scintillator), is interposed between the substrate and the scintillator.

It has in fact been noticed that it was much easier to deposit and apply, within the context of image intensifier tubes, a transparent or slightly absorbent anti-reflecting layer rather than an opaque layer.

This transparent anti-reflecting layer will be a layer of a greater refractive index material than that which constitutes the scintillator. Its thickness will be experimentally chosen so as to minimise the reflection coefficient. This thickness is of the order of magnitude of a tenth of the wavelength emitted by the scintillator in order to obtain an anti-reflecting effect: the thickness will be able to be of the order of 400 to 6000 angstroms if the scintillator emits visible light (the general case).

As slightly absorbent anti-reflecting layer, there will be chosen preferably indium oxide, or alternatively antimony, tin or bismuth oxide, or alternatively a combination of these oxides, such as indium-tin oxide, commonly referred to by the initials ITO. These oxides are preferably in the maximum oxidation state ($In_2O_3$ for indium, $SnO_2$ for tin, $Sb_2O_3$ for antimony, $Bi_2O_3$ for bismuth). These materials have, among other things, the advantage of having a high refractive index.

It can also be envisaged that the layer is in reality a superposition of several layers, in particular a superposition with gradual decrease (from the substrate to the scintillator) of the refractive index.

All the materials indicated above exhibit not only the advantage of great ease of application, but also of good chemical compatibility with caesium iodide, and they improve the adherence of the scintillation layer to the substrate.

Other characteristics and advantages of the invention will emerge on reading the detailed description which follows, and which is made with reference to the attached drawings in which:

FIG. 1, already described, represents the prior art with the explanation of the loss of resolution due to the photons emitted towards the rear and reflected on the aluminium substrate.

FIG. 2 represents a diagram of the make up of the input screen of an image intensifier tube according to the invention.

The screen make up according to the invention has been represented in FIG. 2.

A start is made from a substrate 10 which is preferably an aluminium sheet in the form of a paraboloid of revolution. The substrate can also be an aluminium based alloy. Its thickness is of the order of half a millimeter. For this thickness, it possesses good transparency to X-rays (with energy of the order of 60 keV in conventional medical radiology). Provision is preferably made for the interior surface of the substrate to be satin finished by dipping in soda.

According to the invention, a thin, transparent anti-reflecting layer 20 is deposited on this substrate. It is preferably made from indium oxide $In_2O_3$ and it can preferably have a thickness ranging between 400 and 2000 angstroms.

The deposition is carried out by vacuum evaporation of oxide, or alternatively by reactive cathode sputtering from oxide. However, evaporation or metal sputtering followed by thermal oxidation (at temperatures of a few hundred degrees: from 350° C. and above oxidation of indium is obtained) can also be carried out. These techniques are conventional and are moreover used for the layer 14 of FIG. 1.

The anti-reflecting layer thus deposited adheres well to the aluminium substrate.

A scintillation layer 12 of a few hundred microns in thickness, for example 400 microns, is next deposited on the anti-reflecting layer. This layer will be constructed from an alkali halide, caesium iodide (doped with sodium or thallium) being currently the most commonly used in this type of application.

Caesium iodide emits for example at a wavelength of about 4300 angstroms (blue light), this wavelength being able to vary with the doping of the iodide. Its refractive index is about 1.7.

In order to act as an anti-reflecting layer, it will be noted that the transparent or slightly absorbent layer 20 must have a refractive index greater than that of the scintillation layer. This is indeed the case if the transparent layer is made from indium oxide (index greater than 2) and if the scintillator is made from caesium iodide.

As regards the thickness to be imparted to the anti-reflecting layer, it can be stated that it can theoretically be calculated as a function of the refractive index ratios (between its index and that of the scintillator), the luminous wavelengths emitted, and the reflection angles that it is particularly desired to eliminate. However in practice this calculation is very difficult given the fact that the surface of the aluminium is not smooth but has a satiny texture, and the fact that the caesium iodide deposition is uneven. Consequently, the optimal thickness to be imparted to the layer 20 in order to afford the role of anti-reflecting layer which is desired, will be defined by experimentation. This thickness will be of the order of magnitude of the wavelengths emitted by the scintillator, for example ranging between 400 and 2000 angstroms for a conventional caesium iodide scintillator emitting blue light.

The adherence of caesium iodide or other alkali halides to the anti-reflecting layer is excellent. The differential expansion stresses between aluminium, indium oxide and caesium iodide are entirely acceptable, and the chemical compatibility between caesium iodide and the anti-reflecting layer is likewise very good. This fact is important since caesium iodide is a very reactive substance.

After formation of the scintillation layer 12, a transparent conductive layer 14 is deposited, the role of which is in particular to uniformly ensure the earthing of the photocathode. This layer is connected externally to earth. It is transparent so as not to interfere with the transmission of luminous photons from the scintillator 12 to the photocathode. It is preferably made from indium oxide. It could also be another semiconductor oxide such as tin or antimony oxide, or a combination such as ITO. It has a thickness of a few hundred angstroms.

A photocathode layer 16, in general constituted by an alkali antimonide such as SbKCs, is next deposited on this transparent layer. The layer is very thin (about 150 to 200 angstroms).

We claim:

1. Input screen for radiological image intensifier tube, comprising a support (10) carrying a scintillation layer (12), characterised in that a thin anti-reflecting layer (20), transparent or slightly absorbent to the wavelength emitted by the scintillation layer, is interposed between the support and the scintillation layer.

2. Input screen according to claim 1, characterised in that the transparent anti-reflecting layer (20) is made from a material with optical index greater than that of the scintillation layer.

3. Input screen according to either of claims 1 and 2, characterised in that the anti-reflecting layer (20) is made from indium oxide.

4. Input screen according to either of claims 1 and 2, characterised in that the anti-reflecting layer is made from antimony, tin, or bismuth oxide.

5. Input screen according to either of claims 1 and 2, characterised in that the anti-reflecting layer is a combination of oxides selected from the oxides of indium, antimony, tin and bismuth, in particular indium-tin oxide.

6. Input screen according to one of claims 1 to 2, characterised in that the anti-reflecting layer is a superposition of different layers.

7. Input screen according to one of claims 1 to 2, characterised in that the scintillation layer is based on caesium iodide.

8. Input screen according to one of claims 1 to 2, wherein the support is made from aluminium or aluminium-based alloy.

9. Input screen according to one of claims 1 to 2, characterised in that a conductive transparent layer (14) is deposited on the scintillation layer and a photocathode layer (16) is deposited on this conductive transparent layer.

* * * * *